(12) United States Patent
Liu et al.

(10) Patent No.: US 9,961,661 B2
(45) Date of Patent: May 1, 2018

(54) DETERMINATION OF A COMMUNICATION OBJECT

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days. days.

(21) Appl. No.: 15/034,871

(22) PCT Filed: Nov. 6, 2014

(86) PCT No.: PCT/CN2014/090431
§ 371 (c)(1),
(2) Date: May 5, 2016

(87) PCT Pub. No.: WO2015/067187
PCT Pub. Date: May 14, 2015

(65) Prior Publication Data
US 2016/0286518 A1 Sep. 29, 2016

(30) Foreign Application Priority Data

Nov. 7, 2013 (CN) .......................... 2013 1 0549933

(51) Int. Cl.
*H04W 64/00* (2009.01)
*H04M 1/725* (2006.01)
(Continued)

(52) U.S. Cl.
CPC ........ *H04W 64/00* (2013.01); *G06K 9/00201* (2013.01); *G06K 9/00208* (2013.01);
(Continued)

(58) Field of Classification Search
CPC .... H04W 64/00; H04W 8/005; H04B 17/318; G06K 9/00201; G06K 9/00208
(Continued)

(56) References Cited

U.S. PATENT DOCUMENTS 8,325,214 B2    12/2012  Hildreth
8,957,973 B2 *  2/2015   Zhang .................. H04N 5/2258
                                                  348/208.1
(Continued)

FOREIGN PATENT DOCUMENTS

CN    101552975 A    10/2009
CN    101682837 A    3/2010
(Continued)

OTHER PUBLICATIONS

International Search Report for PCT Application No. PCT/CN2014/090431, dated Jan. 21, 2015, 2 pages.

*Primary Examiner* — Cong Tran
(74) *Attorney, Agent, or Firm* — Amin, Turocy & Watson, LLP

(57) ABSTRACT

A communication object can be determined based on wireless communication technologies. A method can include determining a communication object according to sensor data of a target device and image information of a visual object; and sending a connection request to a determined communication object. A communication object can be determined according to sensor data of a target device and image information of a visual object, which can accurately match a signal source and a physical device, thereby providing a more reliable basis for communications between mobile network terminal devices.

31 Claims, 3 Drawing Sheets

(51) Int. Cl.
  *H04B 17/318* (2015.01)
  *G06K 9/00* (2006.01)
  *H04W 8/00* (2009.01)
  *H04W 84/18* (2009.01)

(52) U.S. Cl.
  CPC ........ *H04B 17/318* (2015.01); *H04M 1/7253* (2013.01); *H04W 8/005* (2013.01); *H04W 76/14* (2018.02); *H04M 2250/12* (2013.01); *H04M 2250/52* (2013.01); *H04W 4/70* (2018.02); *H04W 4/80* (2018.02); *H04W 84/18* (2013.01)

(58) Field of Classification Search
  USPC ............. 455/418–420, 457, 566, 154.2, 343; 382/276, 285–286, 312–313
  See application file for complete search history.

(56) References Cited

U.S. PATENT DOCUMENTS

| | | | |
|---|---|---|---|
| 2005/0117066 A1 | 6/2005 | Kamijo | |
| 2007/0283296 A1 | 12/2007 | Nilsson | |
| 2012/0032795 A1 | 2/2012 | Ishii et al. | |
| 2012/0076354 A1* | 3/2012 | Price | H04N 5/23203 382/103 |
| 2013/0229342 A1* | 9/2013 | Hiyama | G06F 3/017 345/156 |
| 2013/0231065 A1 | 9/2013 | Hayashi et al. | |
| 2013/0241830 A1* | 9/2013 | Ohta | G06F 3/017 345/158 |
| 2014/0043658 A1* | 2/2014 | Kim | H04N 1/0408 358/450 |
| 2014/0049466 A1* | 2/2014 | Chen | G06F 3/017 345/156 |
| 2014/0071090 A1* | 3/2014 | Onishi | G06F 3/0416 345/174 |
| 2015/0257119 A1* | 9/2015 | Hahm | G01C 17/28 324/226 |

FOREIGN PATENT DOCUMENTS

| | | |
|---|---|---|
| CN | 101874404 A | 10/2010 |
| CN | 102624428 A | 8/2012 |
| CN | 102625981 A | 8/2012 |
| CN | 102667812 A | 9/2012 |
| CN | 101101520 B | 11/2012 |
| CN | 102842213 A | 12/2012 |
| CN | 102932401 A | 2/2013 |
| CN | 103095345 A | 5/2013 |
| CN | 103118282 A | 5/2013 |
| CN | 103605701 A | 2/2014 |
| WO | 2007138393 A2 | 12/2007 |

* cited by examiner

… (1)

DETERMINATION OF A COMMUNICATION OBJECT

RELATED APPLICATION

The present application is a U.S. National Stage filing under 35 U.S.C. § 371 of international patent cooperation treaty (PCT) application No. PCT/CN2014/090431, filed Nov. 6, 2014, and entitled "DETERMINATION OF A COMMUNICATION OBJECT", which claims the benefit of priority to Chinese Patent Application No. 201310549933.1, filed on Nov. 7, 2013, which applications are hereby incorporated into the present application by reference herein in their respective entireties.

TECHNICAL FIELD

The present application relates to the field of wireless communications technologies, and for example, to determining a communication object.

RELATED ART

In a mobile network, search, recognition and determination of a communication object is a very important issue. Conventional Wireless Local Area Network (WLAN) technologies (such as Wi-Fi and Bluetooth, etc) generally support a neighbor discovery function, for example, in a Wi-Fi network, a terminal device may obtain information about all neighbors by scanning a beacon message, and then initiates a connection. Bluetooth can discover a peer device through an inquiry mechanism, and then connects through a page mechanism. However, although such schemes can estimate relative distances through received signal strength, specific directions of devices cannot be estimated. Therefore, a user cannot judge whether a certain signal is from a certain device at a specified position, and such demands are universal in mobile networks. Use of a directional antenna technology can assist in determining a direction of a device, but in a mobile network having dense nodes, an error of determination is larger, and a signal source and a physical device are difficult to be precisely matched.

SUMMARY

An example, non-limiting objective of the present application is to provide a method and an apparatus for determining a communication object, which can achieve precise determination of a communication object in a mobile network.

To these and/or related ends, in a first aspect of one or more embodiments of the present application, a method for determining a communication object is provided, comprising:

determining a communication object according to sensor data of a target device and image information of a visual object; and sending a connection request to the determined communication object.

In a second aspect of one or more of the embodiments of the present application, an apparatus for determining a communication object is provided, where the apparatus includes:

a determining module, configured to determine a communication object according to sensor data of a target device and image information of a visual object; and a sending module, configured to send a connection request to the communication object determined by the determining module.

In a third aspect of one or more of the embodiments of the present application, a computer readable storage device is provided, comprising at least one executable instruction, which, in response to execution, causes a system comprising a processor to perform operations, comprising:

determining a communication object according to sensor data of a target device and image information of a visual object; and sending a connection request to the determined communication object.

In a fourth aspect of one or more of the embodiments of the present application, a device for determining a communication object is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining a communication object according to sensor data of a target device and image information of a visual object; and sending a connection request to the determined communication object.

According to the method and the apparatus in one or more of the embodiments of the present application, a communication object is determined according to sensor data of a target device and image information of a visual object, which can accurately match a signal source and a physical device, thereby providing a more reliable basis for communications between mobile network terminal devices.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
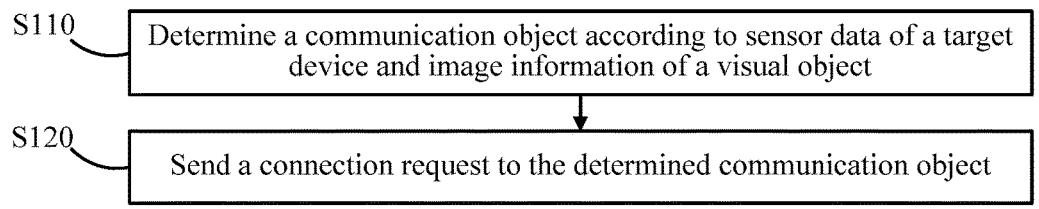
FIG. 1 is an example flowchart of a method for determining a communication object according to an embodiment of the present application.

Specific implementations of the present application are further described in detail hereinafter with reference to the accompanying drawings and embodiments. The following embodiments are intended to describe the present application, but not to limit the scope of the present application.

In mobile network applications, a terminal device (such as, a mobile phone, a camera, a palmtop computer, a personal computer, a tablet computer, and a wearable smart device, etc) usually has shooting and display functions. With development of the mobile Internet, people's requirements on terminal devices are not merely limited to their original basic functions, and more collaborations between terminal devices are required to meet more demands of users, such as positioning demand, the conventional terminal devices are usually provided with various sensors, such as a gravity sensor, an acceleration sensor and a gyroscope. Embodiments of the present application, based on software and hardware conditions of the conventional mobile terminal devices, propose a method for determining a communication object based on sensor data and image information, so as to provide a more reliable basis for communications between mobile network terminal devices.

For better understanding of the embodiments of the present application, terms used in one or more of the embodiments of the present application are now explained as follows.

Target device: is a terminal device that waits for establishing a communication connection, which may be provided with various possible sensors, or related sensor data of which may be collected.

Local device: is a device that initiates a communication connection, that is, a device that needs to determine a communication object. In one or more of the embodiments of the present application, the local device at least has image collecting and display functions, and may be fixed or held or carried by a user. For example, the local device is a micro digital camera, or a device including a micro digital camera, and the micro digital camera refers to an apparatus that converts optical images into electronic data by using an electronic sensor, including a lens, an image sensor, a DSP computing unit and other components, and capable of achieving functions of recording, processing and storing static or dynamic images.

Visual object: is an object that can be seen within a visual field for image collection of the local device, where the visual object may be a holder or carrier of at least one target device, including a human, an animal or another movable entity, and capable of being identified, recognized or viewed by a shooting device.

In addition, the sensor data described in one or more of the embodiments of the present application may include one or more of the following: velocity, acceleration, direction, angular velocity, and signal strength data, the sensor data may be generated due to changes in movement or posture of the corresponding holder or carrier, and used for recognizing an action of the corresponding holder or carrier in the embodiments of the present application, where the action preferably refers to an action that can be collected and recognized by the local device.

As shown in FIG. 1, a method for determining a communication object according to an embodiment of the present application includes the following steps.

S110. Determine a communication object according to sensor data of a target device and image information of a visual object.

In a method according to an embodiment of the present application, the sensor data is from one or more target devices, after a holder or carrier of the target device has completed a certain action or changes a gesture, a series of related sensor data may be generated correspondingly, and the target device may directly send out all or part of original sensor data relevant to the action, and may also send out processed data that can be more easily or directly used for action recognition. According to a method of an embodiment of the present application, after the sensor data sent by the target device is received, at least one communication object is determined from at least one target device corresponding to sensor data capable of matching image information of at least one visual object.

S120. Send a connection request to the determined communication object.

After the communication object is determined, a communication connection is started by sending a connection request to the communication object.

According to a method of an embodiment of the present application, a communication object is determined according to sensor data of a target device and image information of a visual object, which can precisely match a signal source and a physical device, thereby providing a more reliable basis for communications between mobile network terminal devices.

Figure 2:
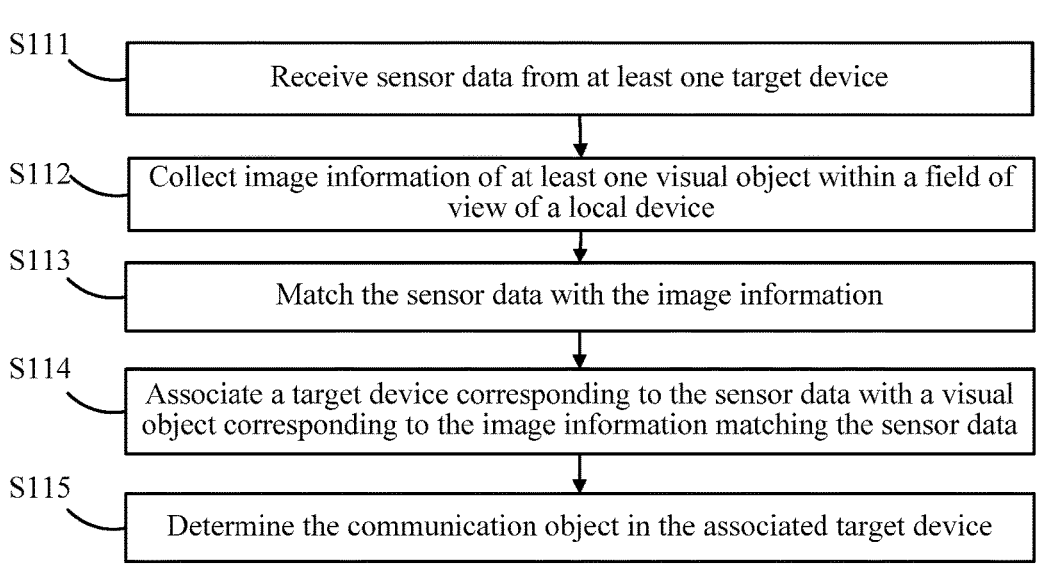
FIG. 2 is an example detailed flowchart of the method shown in FIG. 1.

Specifically, as shown in FIG. 2, step S110 further includes:

S111. Receive sensor data from at least one target device.

The sensor data may be sent by the target device to a particular local device according to its own configuration through any possible communication protocol or sent by means of broadcasting. In a method of an embodiment of the present application, alternatively, the sensor data is data sent by means of broadcasting. The sensor data includes other information associated with the target device, such as an ID of the target device.

S112. Collect image information of at least one visual object within the visual field of the local device.

The visual field of the local device is a space range currently displayed on the local device, one or more visual objects may appear in the space range, and when a visual object appears in the visual field of the local device, image information of the visual object is collected.

S113. Match the sensor data with the image information.

After receiving the sensor data, the local device can analyze and process the sensor data, and recognize movement of the corresponding target device. Action recognition of the target device can be performed according to any possible method for performing action recognition based on recognition of various sensor data known in this field, which is not described herein. Certainly, when the sensor data is data that has been processed, the data may not be processed or processed less, thereby recognizing an action of the target device. After the action of the target device is recognized, the action is matched with the collected image information.

S114. Associate a target device with a visual object corresponding to the image information matching the sensor data of the target device.

After the matching in step S113, a target device corresponding to the sensor data is associated with a visual object corresponding to the image information matching the sensor data, and it should be noted that, one visual object may be associated with a plurality of target devices.

S115. Determine a communication object from the associated target device.

In step S115, the communication object may be determined automatically from the associated target device according to a preset policy, or the communication object may be determined from the associated target device according to a user selection.

In one or more of the embodiments of the present application, the preset policy may include:

determining the communication object from the associated target device corresponding to an image presented within the visual field of the local device according to an image characteristic of the image. For example, when the area of an image of a visual object accounts for a large proportion in the visual field of the local device (for example, exceeds a set value (for example, more than 60%)), it can be roughly inferred that, at this time, a main focus object of the local device is that visual object, and thus at least one target device associated with the visual object accounting for a large proportion is selected as the communication object. For another example, when an image of a visual object is within a set region (for example, at the middle) of the visual field of the local device, it can be roughly inferred that, at this time, a main focus object of the local device is that visual object, and thus at least one target device associated with the visual object in the set region is selected as the communication object. In addition, the preset policy may further include: determining the communication object according to signal strength of the associated target device, alternatively, the signal strength being included in the sensor data.

The preset policy may also be a reasonable combination of the several policies. For example, the image characteristic and the signal strength of the target devices are taken into account at the same time: first, all visual objects with proportions of areas of images within the visual field of the local device and exceeding the set value are selected, and then the communication object is determined according to the signal strength of the associated target devices. Or, the signal strength is considered first and then the location of the visual object is considered.

It should be noted that, in step S111, the sensor data from the at least one target device may be received according to a first communication protocol, and the first communication protocol is a short-distance wireless communication protocol, such as, Bluetooth Low Energy (BLE), WiFi, Bluetooth, ZigBee, Ultra-Wideband (UWB), Infrared, or Near Field Communication (NFC). In step S120, the connection request can be sent to the determined communication object according to a second communication protocol. The second communication protocol may also be any short-distance wireless communication protocol, such as BLE, WiFi, Bluetooth, ZigBee, UWB, Infrared, or NFC; preferably, the first communication protocol and the second communication protocol are different communication protocols, for example, the BLE protocol is used in broadcasting and/or receiving the sensor data, while WiFi is used in sending and/or waiting for receiving the connection request, so as to save power consumption as much as possible. In addition, when different communication protocols are used for communications, data packets are packaged according to corresponding protocols.

Furthermore, the connection request sent in step S120 should include device information of the local device, for example, a device ID, some possible performance parameters, and other information necessary for establishing communications, for the communication connection determination of target device.

Figure 3:
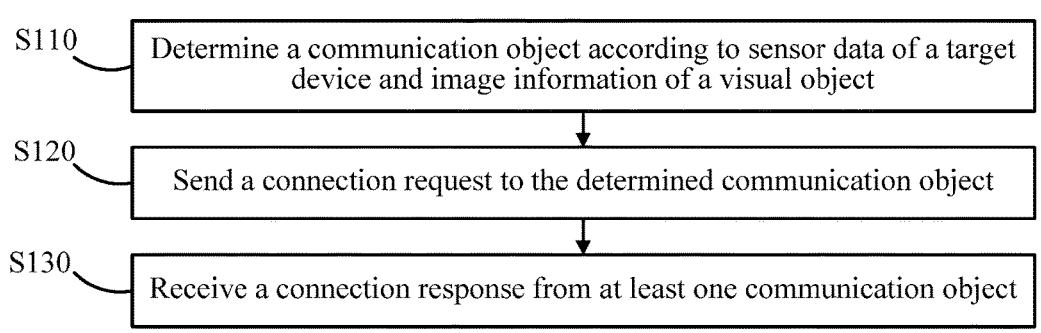
FIG. 3 is an example flowchart of another method for determining a communication object according to an embodiment of the present application.

As shown in FIG. 3, in a method according to another embodiment of the present application, after the connection request is sent in step S120, the method further includes the following step.

S130. Receive a connection response from at least one communication object, so as to complete establishment of a communication connection.

Those skilled in the art can understand that, in methods of one or more of the embodiments of the present application, sequence numbers of the steps do not mean an order of execution, the order of execution of the steps should be determined according to their functions and internal logic, but should not pose any limitation to implementation of the specific embodiments of the present application.

Figure 4:
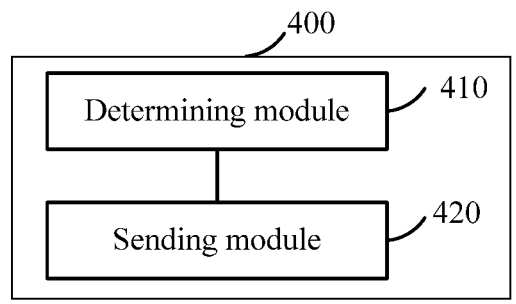
FIG. 4 is an example structural diagram of an apparatus for determining a communication object according to an embodiment of the present application.

The present application further provides an apparatus for determining a communication object, and the apparatus may be a part of a local device, or another apparatus independent of the local device. As shown in FIG. 4, an apparatus 400 for determining a communication object according to an embodiment of the present application includes the following modules.

A determining module 410 is configured to determine a communication object according to sensor data of a target device and image information of a visual object.

In an apparatus of an embodiment of the present application, the sensor data is from one or more target devices, after a holder or carrier of the target devices has completed a certain action, a series of related sensor data may be generated correspondingly, and the target devices may directly send out all or part of original sensor data relevant to the action, and may also send out processed data that can be more easily or directly used for action recognition. After receiving the sensor data sent by the target device, the determining module 410 determines at least one communication object from at least one target device corresponding to sensor data capable of matching the image information of the visual object.

A sending module 420 is configured to send a connection request to the communication object determined by the determining module 410. After determining the communication object, the determining module 410 starts a communication connection through the connection request sent by the sending module 420.

According to an apparatus of an embodiment of the present application, a communication object is determined according to sensor data of a target device and image information of a visual object, which can precisely match a signal source and a physical device, thereby providing a more reliable basis for communications between mobile network terminal devices.

Figure 5:
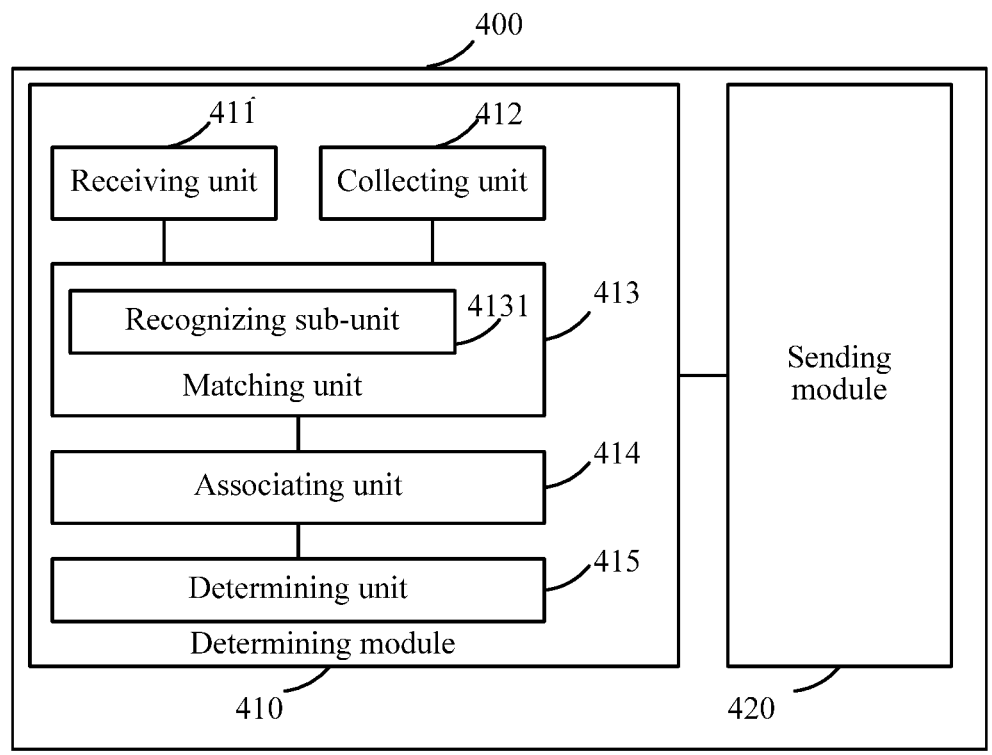
FIG. 5 is an example detailed structural diagram of the apparatus shown in FIG. 4.

Specifically, as shown in FIG. 5, the determining module 410 further includes the following units.

A receiving unit 411 is configured to receive sensor data from at least one target device. When the apparatus 400 belongs to a part of a local device and the local device has a receiving function, the apparatus 400 may share the same receiving unit 411 with the local device.

The sensor data may be sent by the target device to a particular local device according to its own configuration through any possible communication protocol or sent by means of broadcasting. In an apparatus of an embodiment of the present application, alternatively, the sensor data is data sent by means of broadcasting. The sensor data includes other information associated with the target device, such as, an ID of the target device.

A collecting unit 412 is configured to collect image information of at least one visual object within the visual field of a local device.

The visual field of the local device is a space range currently displayed on the local device, one or more visual objects may appear in the space range, and when a visual object appears in the visual field of the local device, image information of the visual object is collected.

A matching unit 413 is configured to match the sensor data with the image information.

The matching unit 413 may further include a recognizing sub-unit 4131, configured to analyze and process the sensor data after the local device receives the sensor data, and recognize movement of the corresponding target device. The recognizing sub-unit 4131 can perform action recognition on the target device according to any possible method for performing action recognition based on recognition of various sensor data known in this field, which is not described herein. Certainly, when the sensor data is data that has been processed, the matching unit 413 may not process the data or process the data less, thereby recognizing an action of the target device. After the action of the target device is recognized, the action is matched with the collected image information.

An associating unit 414 is configured to associate the target device with a visual object corresponding to the image information matching the sensor data of the target device. After the matching of the matching unit 413, the target device corresponding to the sensor data is associated with the visual object corresponding to the image information matching the sensor data, and it should be noted that, one visual object may be associated with a plurality of target devices.

A determining unit 415 is configured to determine the communication object from the associated target device.

The determining unit 415 can determine the communication object automatically from the associated target device according to a preset policy, or determine the communication object in the associated target device according to a user selection.

In one or more of the embodiments of the present application, the preset policy may include:
  determining the communication object from the associated target device corresponding to an image presented within the visual field of the local device according to an image characteristic of the image. For example, when the area of an image of a visual object accounts for a large proportion in the visual field of the local device (for example, exceeds a set value (for example, more than 60%)), it can be roughly inferred that, at this time, a main focus object of the local device is that visual object, and thus at least one target device associated with the visual object accounting for a large proportion is selected as the communication object. For another example, when an image of a visual object is within a set region (for example, at the middle) of the visual field of the local device, it can be roughly inferred that, at this time, a main focus object of the local device is that visual object, and thus at least one target device associated with the visual object in the set region is selected as the communication object. In addition, the preset policy may further include: determining the communication object according to signal strength of the associated target device, alternatively, the signal strength being included in the sensor data.

The preset policy may also be a reasonable combination of the several policies. For example, the image characteristic and the signal strength of the target devices are taken into account at the same time: first, all visual objects with proportions of areas of images within the visual field of the local device and exceeding the set value are selected, and then the communication object is determined according to the signal strength of the associated target devices. Or, the signal strength is considered first and then the location of the visual object is considered.

It should be noted that, the receiving unit 411 may receive the sensor data from the at least one target device according to a first communication protocol, and the first communication protocol is a short-distance wireless communication protocol, such as, BLE, WiFi, Bluetooth, ZigBee, UWB, Infrared, or NFC. The sending module 420 may send the connection request to the determined communication object according to a second communication protocol. The second communication protocol may also be any short-distance wireless communication protocol, such as, BLE, WiFi, Bluetooth, ZigBee, UWB, Infrared, or NFC; preferably, the first communication protocol and the second communication protocol are different communication protocols, for example, the BLE protocol is used in broadcasting and/or receiving the sensor data, while WiFi is used in sending and/or waiting for receiving the connection request, so as to save power consumption as much as possible. In addition, when different communication protocols are used for communications, data packets are packaged according to corresponding protocols.

Furthermore, the connection request sent by the sending module 420 should include device information of the local device, for example, a device ID, some possible performance parameters, and other information necessary for establishing communications, for communication connection determination of the target device.

Figure 6:
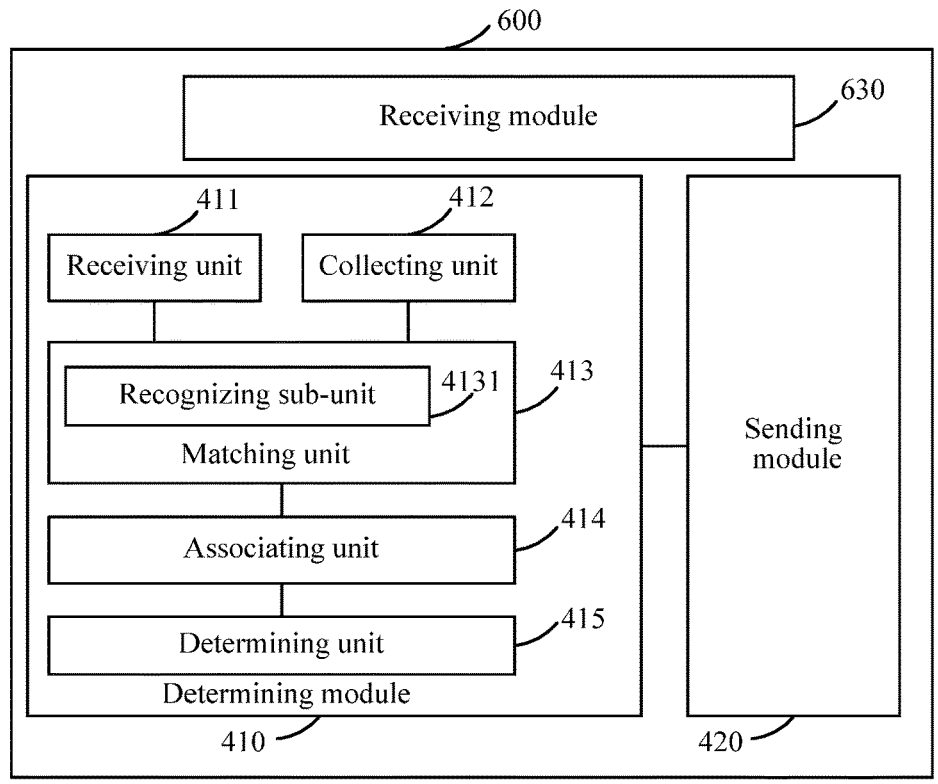
FIG. 6 is an example structural diagram of another apparatus for determining a communication object according to an embodiment of the present application.

As shown in FIG. 6, an apparatus 600 according to another embodiment of the present application further includes following module.

A receiving module 630 is configured to receive a connection response from at least one communication object, so as to complete establishment of a communication connection. The receiving module 630 and the receiving unit 411 may be the same module, and may implement communications according to different protocols.

Figure 7:
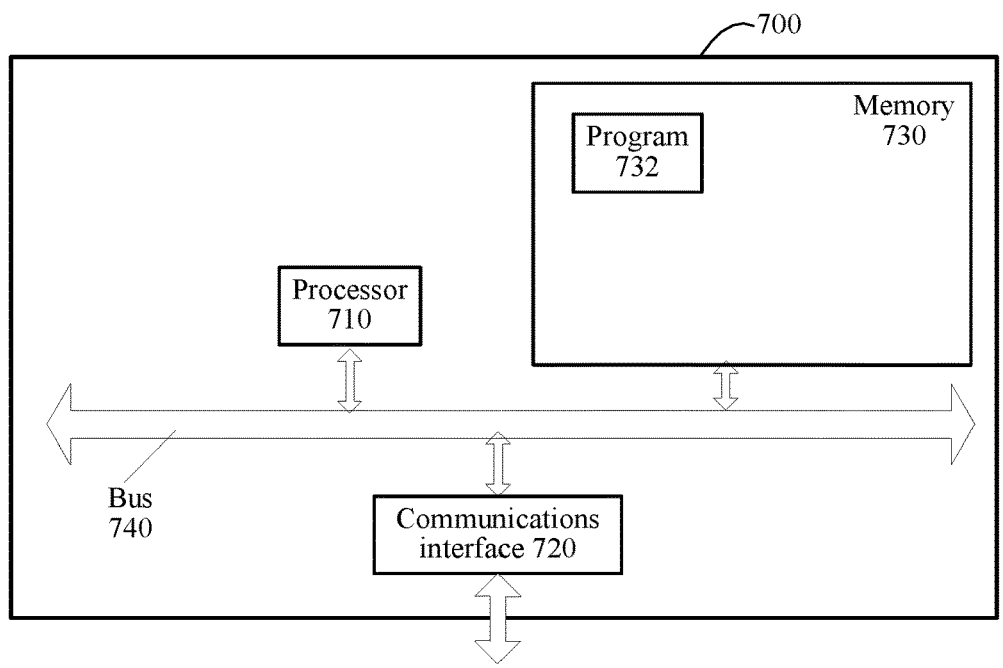
FIG. 7 is an example structural diagram of a still another apparatus for determining a communication object according to an embodiment of the present application.

FIG. 7 illustrates a still another apparatus 700 for determining a communication object according to an embodiment of the present application, and the specific implementation of the apparatus 700 for determining a communication object is not limited in the specific embodiment of the present application. As shown in FIG. 7, the apparatus may include:
  a processor 710, a communications interface 720, a memory 730, and a communications bus 740.

The processor 710, the communications interface 720, and the memory 730 complete mutual communications via the communications bus 740.

The communications interface 720 is configured to communicate with a network element such as a client.

The processor 710 is configured to execute a program 732, and specifically, can execute relevant steps in the process embodiment shown in FIG. 1 to FIG. 3.

Specifically, the program 732 may include a program code, the program code including a computer operation instruction.

The processor 710 may be a central processing unit (CPU), or an application specific integrated circuit (ASIC), or one or more integrated circuits which is configured to implement one or more of the embodiments of the present application.

The memory 730 is configured to store the program 732. The memory 730 may include a high-speed RAM memory, and may also include a non-volatile memory, for example, at least one magnetic disk memory. The program 732 may make the apparatus 700 execute the following steps:

determining a communication object according to sensor data of a target device and image information of a visual object; and sending a connection request to the determined communication object.

Reference may be made to the corresponding steps or units in the embodiments above for specific implementation of each unit in the program 732, which is not repeated herein.

It can be realized by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on the particular applications and design constraint conditions of the technical solution. Those skilled in the art can use different methods to implement the functions described for each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and includes several instructions for enabling a computer module (which can be a personal computer, a server, a network module, or the like) to execute all or some steps of the method described in each embodiment of the present application. The storage medium includes various media capable of storing a program code, such as a USB disk, a mobile hard disk, a read-only memory (ROM), a random access memory (RAM), a magnetic disk, an optical disc, or the like.

The above implementations are only used to describe the present application, instead of limiting the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
    receiving, by a device comprising a processor, sensor data from at least one target device comprising a target device;
    determining, by the device, a communication object from the at least one target device according to the sensor data of the target device and image information of a visual object, wherein the sensor data comprises data indicative of an action or a change in gesture generated in conjunction with a holder or carrier of the target device performing the action or the change in gesture; and
    sending, by the device, a connection request to the communication object;
    wherein the determining the communication object comprises:
        determining the communication object from the at least one target device corresponding to the sensor data that is capable of matching the image information of the visual object.

2. The method of claim 1, wherein the determining the communication object further comprises:
    collecting collective image information of at least one visual object, comprising the visual object, within a visual field of another device within a defined distance from the device;
    matching the sensor data with the collective image information;
    associating the target device with the visual object corresponding to the image information matching the sensor data of the target device; and
    determining the communication object from the target device associated with the visual object.

3. The method of claim 2, wherein the matching the sensor data with the collective image information comprises:
    performing action recognition according to the sensor data.

4. The method of claim 2, wherein the determining the communication object from the target device associated with the visual object comprises:
    determining the communication object from the target device associated with the visual object according to a preset policy.

5. The method of claim 4, wherein the preset policy comprises:
    a policy that determines the communication object from the target device associated with the visual object corresponding to an image within the visual field of the other device according to an image characteristic of the image.

6. The method of claim 4, wherein the preset policy comprises:
    a policy that determines the communication object according to signal strength of the target device associated with the visual object.

7. The method of claim 2, wherein the determining the communication object from the target device associated with the visual object comprises:
    determining the communication object from the target device associated with the visual object according to a user input received by the device.

8. The method of claim 2, wherein the receiving the sensor data from the at least one target device comprises:
    receiving the sensor data according to a first communication protocol.

9. The method of claim 8, wherein the sending the connection request to the communication object comprises:
    sending the connection request according to a second communication protocol.

10. The method of claim 9, wherein the first communication protocol is at least one of a Bluetooth Low Energy (BLE) protocol, a WiFi protocol, a Bluetooth protocol, a ZigBee protocol, an Ultra-Wideband (UWB) protocol, an Infrared protocol, or a Near Field Communication (NFC) protocol.

11. The method of claim 9, wherein the second communication protocol is at least one of a Bluetooth Low Energy (BLE) protocol, a WiFi protocol, a Bluetooth protocol, a ZigBee protocol, an Ultra-Wideband (UWB) protocol, an Infrared protocol, or a Near Field Communication (NFC) protocol.

12. The method of claim 10, wherein the first communication protocol is different from the second communication protocol.

13. The method of claim 1, wherein the connection request comprises device information of another device within a defined distance from the device.

14. The method of claim 1, further comprising:
receiving a connection response from at least one communication object, and establishing a communication connection to the at least one communication object.

15. The method of claim 2, wherein the visual field of the other device is a space range currently displayed on the other device.

16. The method of claim 1, wherein the sensor data comprises at least one of a velocity, an acceleration, a direction, an angular velocity, or a signal strength.

17. An apparatus, comprising:
a memory that stores executable modules; and
a processor, coupled to the memory, that executes the executable modules to perform operations of the apparatus, the executable modules comprising:
a determining module configured to determine a communication object according to sensor data of at least one target device and image information of at least one visual object, wherein the sensor data comprises data indicative of an action or a change in gesture generated in conjunction with a holder or carrier of the target device performing the action or the change in gesture; and
a sending module configured to send a connection request to the communication object determined by the determining module,
wherein the determining module comprises a receiving unit configured to receive the sensor data from the at least one target device, and
wherein the determining module determines the communication object from the at least one target device corresponding to the sensor data capable of matching the image information of the at least one visual object.

18. The apparatus of claim 17, wherein the determining module further comprises:
a collecting unit configured to collect the image information of the at least one visual object within a visual field of a local device;
a matching unit configured to match the sensor data with the image information;
an associating unit configured to associate a target device with a visual object corresponding to the image information matching the sensor data of the target device; and
a determining unit configured to determine the communication object from the target device.

19. The apparatus of claim 18, wherein the matching unit further comprises:
a recognizing sub-unit configured to perform action recognition according to the sensor data.

20. The apparatus of claim 18, wherein the determining unit determines the communication object from the target device according to a preset policy.

21. The apparatus of claim 20, wherein the determining unit determines the communication object from the target device corresponding to an image within the visual field of the local device according to an image characteristic of the image.

22. The apparatus of claim 20, wherein the determining unit determines the communication object according to a signal strength of the target device.

23. The apparatus of claim 18, wherein the determining unit determines the communication object from the target device according to a user selection.

24. The apparatus of claim 18, wherein the receiving unit receives the sensor data according to a first communication protocol.

25. The apparatus of claim 24, wherein the sending module sends the connection request according to a second communication protocol.

26. The apparatus of claim 25, wherein the receiving unit receives the sensor data according to a communication protocol different from a communication protocol according to which the sending module sends the connection request.

27. The apparatus of claim 17, wherein the executable modules further comprise:
a receiving module configured to receive a connection response from at least one communication object, comprising the communication object, and establish at least one communication connection with at least one communication object.

28. A computer readable storage device, comprising at least one executable instruction, which, in response to execution, causes a system comprising a processor to perform operations, comprising:
receiving sensor data from at least one target device, comprising a target device;
determining a communication object from the at least one target device according to sensor data of the target device and image information of a visual object, wherein the sensor data comprises data indicative of an action or a change in gesture generated in conjunction with a holder or carrier of the target device performing the action or the change in gesture; and
sending a connection request to the communication object;
wherein the determining the communication object comprises:
determining the communication object from the at least one target device corresponding to the sensor data that is capable of matching the image information of the visual object.

29. The computer readable storage device of claim 28, wherein the determining the communication object further comprises:
collecting collective image information of at least one visual object, comprising the visual object, within a visual field of another device within a defined distance from the device;
matching the sensor data with the collective image information;
associating the target device with the visual object corresponding to the image information matching the sensor data of the target device; and
determining the communication object from the target device associated with the visual object.

30. A device for determining a communication object, comprising a processor and a memory, wherein the memory stores executable instructions, the processor is connected with the memory via a communication bus, and in response to execution of the executable instructions the device performs operations, comprising:
determining a communication object according to sensor data of a target device and image information of a visual object, wherein the sensor data comprises data indicative of an action or a change in gesture generated in conjunction with a holder or carrier of the target device performing the action or the change in gesture; and sending a connection request to the communication object, wherein the operations further comprise receiving the sensor data from at least one target device;

wherein the determining the communication object comprises:

determining the communication object from the at least one target device corresponding to the sensor data that is capable of matching the image information of the visual object.

31. The device of claim 30, wherein the determining the communication object further comprises:

collecting collective image information of at least one visual object, comprising the visual object, within a visual field of another device within a defined distance from the device;

matching the sensor data with the collective image information;

associating the target device with the visual object corresponding to the image information matching the sensor data of the target device; and determining the communication object from the target device associated with the visual object.

\* \* \* \* \*